United States Patent [19]
Holmes

[11] 4,199,007
[45] Apr. 22, 1980

[54] HIGH FREQUENCY-HIGH FLOW SERVO VALVE

[75] Inventor: Lloyd H. Holmes, Salt Lake City, Utah

[73] Assignee: E-Systems, Inc., Dallas, Tex.

[21] Appl. No.: 881,660

[22] Filed: Feb. 27, 1978

[51] Int. Cl.² ............................................. F15B 13/04
[52] U.S. Cl. .................... 137/625.17; 91/467; 137/624.13; 137/625.23; 137/625.24
[58] Field of Search ............... 137/625.17, 625.23, 137/625.24, 624.13; 91/467

[56] References Cited
U.S. PATENT DOCUMENTS

| | | | |
|---|---|---|---|
| 1,546,579 | 7/1925 | Hammond | 137/625.23 X |
| 2,980,138 | 4/1961 | Detweiler et al. | 137/625.17 X |

FOREIGN PATENT DOCUMENTS 1814168   6/1969   Fed. Rep. of Germany ...... 137/625.63

*Primary Examiner*—Gerald A. Michalsky
*Attorney, Agent, or Firm*—Robert V. Wilder; Albert M. Crowder, Jr.

[57] ABSTRACT

A servo valve controls the rate and direction of flow of a hydraulic fluid from a fluid power system to impart reciprocating motion to the piston of a hydraulically driven motor. An outer sleeve member of the servo valve has entry and exit ports connected to the source of fluid power and motor control ports connected to the hydraulically driven motor. A slider member is positioned within a cylindrical opening through the sleeve member and includes fluid chambers within the slider for alternating the direction of fluid flowing to the hydraulically driven motor by rotating the slider member. The rate of fluid flow is controlled by the lateral movement of the slider within the sleeve member.

13 Claims, 6 Drawing Figures

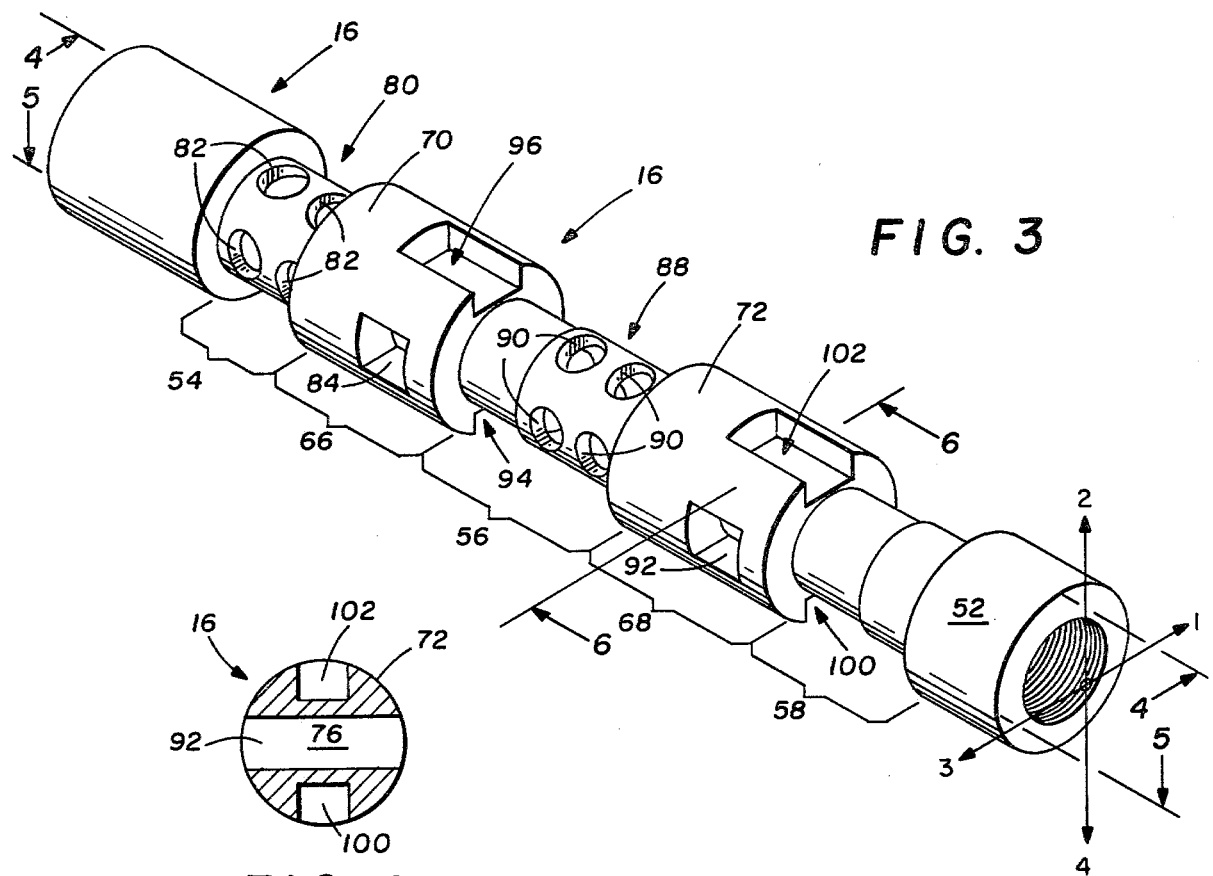
FIG. 3
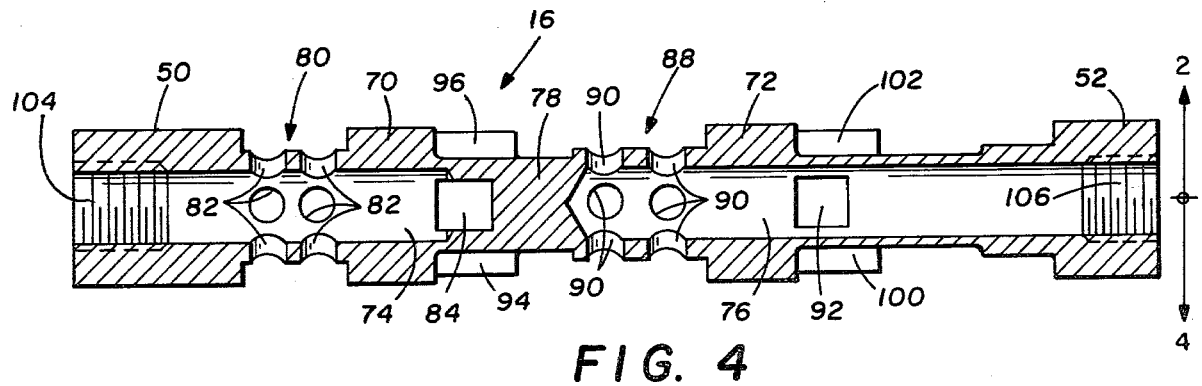
FIG. 6
FIG. 4
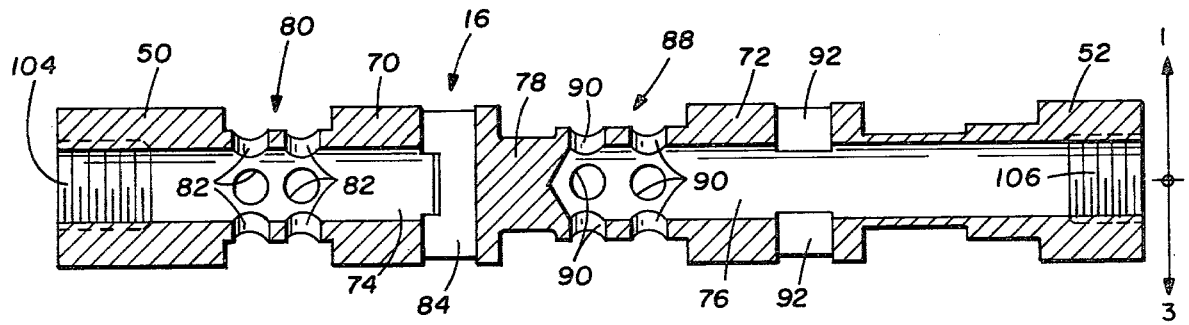
FIG. 5

HIGH FREQUENCY-HIGH FLOW SERVO VALVE

FIELD OF THE INVENTION

This invention relates to hydraulic servo valves, and more particularly relates to a servo valve which establishes a set frequency of alternate hydraulic fluid flow.

DESCRIPTION OF THE PRIOR ART

Servo valves are used in hydraulic fluid systems for controlling hydraulically driven motors by the direction and quantity of fluid flowing in response to an input signal. The typical hydraulic motor has a piston fitted within a cylinder, dividing it into two fluid sealed chambers. The frequency at which the piston reciprocally operates is determined by the rate at which the servo valve alternates the source of fluid pressure from one face of the reciprocating piston to the opposite face. Fluid introduced under pressure into a first chamber of the hydraulic motor expands against the face of the reciprocating piston, causing it to move in the axial direction and forcing fluid to exhaust from a second chamber. By directing the fluid to flow into the second chamber, the reciprocating piston is moved in the opposite direction, exhausting fluid from the first chamber of the motor.

Prior art servo valves have been used to impart a reciprocating motion to a piston of a hydraulic motor by the lateral oscillatory motion of a slider member received within a sleeve member. The mechanical limitations inherent in such an arrangement have made such servo valves frequency sensitive. While the lateral oscillatory motion of the slider may be satisfactory at lower frequency ranges, such an arrangement is unsatisfactory for higher frequency operation of the hydraulic motor. A slider member moving laterally comes to rest twice each cycle, accelerating first in one direction, decelerating and coming to rest before it begins accelerating in the opposite direction. A need has thus arisen for a servo valve to be operational at high flow and high frequency conditions without the mechanical limitations present in the back and forth lateral motion of a slider member.

SUMMARY OF THE INVENTION

The present invention provides a servo valve offering an improved frequency responsive system to control a set cycle for a reciprocating piston of a hydraulic motor. The continuous rotational motion of a slider member within a sleeve member provides the servo valve of the present invention with an improved valve for adjusting the direction and quantity of fluid flow to a hydraulic motor. Servo valves have been constructed in accordance with the present invention and operated in a system with a fluid pressure of 5,500 p.s.i. at a frequency of 33 Hz. and at a flow rate of 205 gpm. Even higher frequencies and flow rates are obtainable with higher pressures.

In accordance with the present invention, a servo valve having a slider member received for movement within a sleeve member establishes control for the direction and rate of flow of a hydraulic fluid from a fluid power system to a hydraulically driven motor. The sleeve member has entry and exit ports for communicating fluid and motor control ports for communicating the fluid between the fluid power system and the hydraulically driven motor. The improved structure of the servo valve includes means for establishing the direction of fluid flow by rotational movement of the slider within the sleeve member. The servo valve further includes means for controlling the rate of fluid flow by lateral movement of the slider within the sleeve. The improved means for establishing the direction of fluid flow includes a plurality of fluid chambers formed through the slider member, where the fluid chambers include entry and exit ports which are alignable by rotation of the slider with the fluid power system entry and exit ports and the motor control ports. By so aligning the fluid chambers, the fluid is directed through first and second fluid circuits to control the frequency of operation of the hydraulically driven motor.

Also in accordance with the present invention, an improved servo valve is provided having a slider member disposed for movement within a sleeve member for alternating the direction of fluid flow from a fluid power source through entry and exit ports within the sleeve member. The sleeve member further communicates the flow of fluid to motor control ports to establish a set frequency of alternating fluid flow for controlling a reciprocating piston of a hydraulically driven motor. The improved structure includes a plurality of chambers formed within the slider member, where the chambers include first and second flow ports to form fluid passageways through the chamber, such that a first fluid circuit is established from the fluid power source to a face of the reciprocating piston. Reduced diameter sections of said sliders form a plurality of annular passageways between the slider and sleeve member. Increased diameter sections of said slider form a plurality of fluid sealing members. Further, fluid channels are spaced about the fluid sealing members such that a second fluid circuit is provided through the annular fluid passageways in said fluid channels by rotation of the slider to cause fluid to be directed to the opposite face of the reciprocating piston. Means are provided for rotating the slider member within the sleeve member to establish a set cycle of fluid flow alternating between the first and second fluid circuits to establish a set frequency of reciprocating motion to the piston of the hydraulically driven motor.

BRIEF DESCRIPTION OF THE DRAWINGS

For a more complete understanding of the present invention and further advantages thereof, reference is now made to the following description taken in conjunction with the following drawings:

FIG. 3 is a perspective view of the slider member of the present invention;

FIG. 4 is a cross-sectional side view of the slider assembly illustrated in FIG. 3 taken along the line 4—4;

FIG. 5 is a cross-sectional side view of the slider assembly illustrated in FIG. 3 taken along the line 5—5; and FIG. 6 is a cross-sectional view of the slider assembly illustrated in FIG. 3 taken along the longitudinal axis through the line 6—6.

DESCRIPTION OF THE PREFERRED EMBODIMENT

Figures 1, 2:
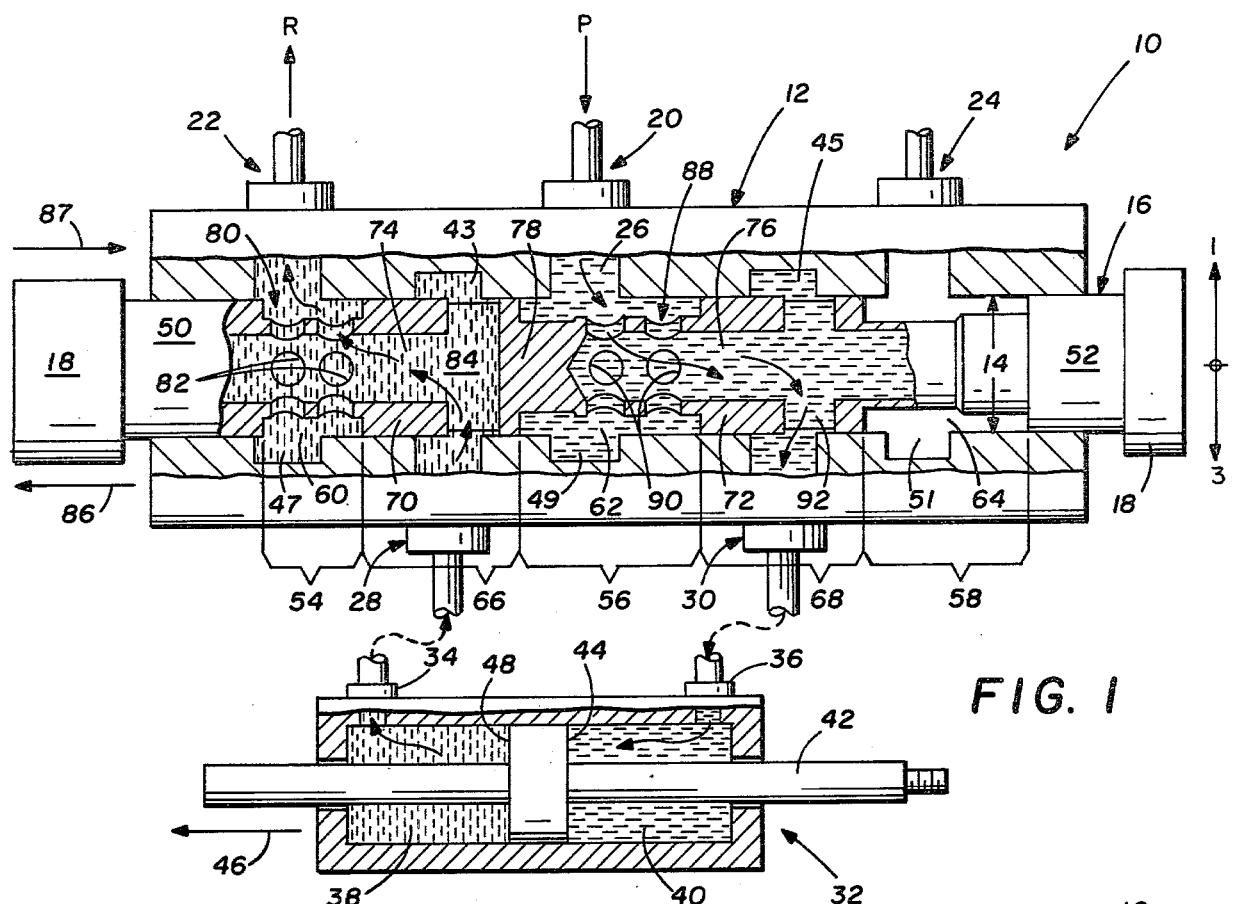
FIG. 1 is a cross-sectional side view of the preferred embodiment of the present invention, illustrating the slider assembly in a first position "1-3" for directing fluid to a first chamber of a hydraulic motor.
FIG. 2 is another cross-sectional view of the preferred embodiment of the present invention illustrating the slider assembly rotated 90° to a second position "2-4" for directing fluid to a second chamber of the hydraulic motor.

Referring to the figures, FIG. 1 shows a cross-sectional side view of the preferred embodiment of the servo valve, generally identified by the reference numeral 10. A generally cylindrical sleeve member 12 has a cylindrical opening 14 running along the central longitudinal axis of the sleeve member 12. A slider member 16 is received within the cylindrical opening 14 and includes coupling members 18 attached to either end of slider 16 for imparting lateral and rotational movement to the slider 16.

The sleeve member 12 is connected to a source of fluid power (not shown) through a pump entry port 20 between first and second reservoir exhaust ports 22 and 24. The hydraulic fluid 26 is introduced under pressure through the pump entry port 20 and exhausted through either the first reservoir exhaust port 22 or the second reservoir port 24 to the fluid power system. The slider 16 is shown in a first position in FIG. 1 for exhausting fluid 26 through first exhaust port 22.

First and second motor control ports 28 and 30 are provided in sleeve member 12 for directing the pressurized hydraulic fluid 26 to a hydraulically driven motor 32. The first and second motor control ports 28 and 30 communicate the flow of hydraulic fluid 26 through first and second piston chamber ports 34 and 36. The first and second piston chamber ports 34 and 36 communicate with a first and second internal piston chambers 38 and 40, defined by the position of a reciprocating piston rod 42 within the hydraulically driven motor 32.

The sleeve member 12 includes first and second recessed sections 43 and 45 opposite motor control ports 28 and 30. Sleeve member 12 further includes third, fourth and fifth recessed sections 47, 49 and 51 opposite entry and exit ports 20, 22 and 24. The recessed sections 43, 45, 47, 49 and 51 operate as force balancing zones to prevent the slider 16 from locking up within the sleeve 12.

As illustrated in FIG. 1, the first position of the slider member 16, indicated by the line 1–3, directs the hydraulic fluid 26 into the second internal piston chamber 40, exerting a force against the piston face 44 within the second internal chamber 40, causing the reciprocating piston rod 42 to move laterally in the direction indicated by the arrow 46. The opposite piston face 48 compresses the hydraulic fluid 26 within the first internal piston chamber 38 to exhaust hydraulic fluid 26 through the first motor control port 28 and eventually through the first reservoir exhaust port 22 to the reservoir of the fluid power system.

The slider member 16 includes first and second fluid sealing ends 50 and 52, in a sealing engagement with the interal side walls of cylindrical opening 14 to prevent hydraulic fluid 26 from escaping sleeve member 12. Fluid sealing ends 50 and 52 have proven satisfactory in practice by closely machining the diameter of ends 50 and 52 to engage the side walls of cylindrical opening 14. Of course, other fluid sealing arrangements could be provided by including fluid sealing gaskets or the like to prevent the hydraulic fluid 26 from escaping.

The slider member 16 includes first, second and third reduced diameter sections 54, 56 and 58, forming first, second and third annular fluid passageways 60, 62 and 64 within the cylindrical opening 14 of sleeve member 12. A first enlarged diameter section 66 is formed between first and second reduced diameter sections 54 and 56, while a second enlarged diameter section 68 is formed between the second and third reduced diameter sections 56 and 58. The first and second enlarged diameter sections include first and second fluid sealing lands 70 and 72.

The slider member 16 has first and second fluid chambers 74 and 76, separated by a solid section 78. The first fluid chamber 74 includes a first flow port 80, consisting of a plurality of fluid passage holes 82 positioned at 90° intervals about the circumference of the first reduced diameter section 54. Of course, the fluid passage holes 82 may vary in size, shape and location about the section 54. A fluid flow port 84 of chamber 74 is aligned with one set of the fluid passage holes 82, such that the slider member 16 when positioned as shown in FIG. 1 provides a passageway for exhausting fluid from the first motor control port 28 to the first reservoir exhaust port 22 via the flow port 84, the first fluid chamber 74 and first flow port 80 to the first reservoir exhaust port 22. The lateral position of the slider member 16 within the sleeve member 12 controls the rate of flow of fluid exhausting from the first motor control port 28 to the first reservoir exhaust port 22. Movement of the slider member 16 in the direction of arrow 86 would move the first fluid sealing land 70 away from its position blocking fluid flow from the first motor control port 28, increasing the rate of flow to the first reservoir exhaust port 22. Movement of the slider in the opposite direction indicated by reference arrow 87 would reduce the flow of fluid making it possible to stop movement of piston 44 by positioning sealing land 70 over motor control port 28.

The second fluid chamber 76 likewise includes a first fluid flow port 88, consisting of a plurality of first fluid passage holes 90 positioned at 90° intervals about section 56. A second fluid flow port 92 is aligned with one set of the first fluid passage holes 90 to provide a fluid passageway from the pump entry port 20 to the second motor control port 30 when the slider member 16 is aligned within the sleeve member 12 as shown in FIG. 1. The second fluid sealing land 72 controls the rate of flow of fluid to the second motor control port 30, where fluid flow may be increased by lateral movement of the slider member in the direction of arrow 86 and decreased by movement in the direction shown by arrow 87.

The third annular fluid passageway 64 does not provide a passageway for fluid in the first position of slider 16 illustrated in FIG. 1.

FIG. 2 illustrates the servo valve of FIG. 1 wherein the slider member 16 is rotated 90° to a second position, indicated by the line 2–4, changing the direction of the fluid flow to the opposite chambers 38 and 40 of the hydraulically driven motor 32. By so rotating the slider member 16 the second fluid flow port 92 of the second fluid chamber 76 is now in sealing engagement with the internal walls of cylindrical opening 14, preventing the fluid 26 from flowing through the chamber 76. As a result, hydraulic fluid 26 entering the pump entry port 20 flows through the second annular fluid passageway 62 until it is directed by first and second fluid channels 94 and 96, spaced 180° apart about the first enlarged diameter section 66 of slider member 16. The hydraulic fluid 26 is thus directed by the first fluid channel 94 to the first motor control port 28, communicating with the first internal piston chamber 38. Of course, as the slider member 16 is rotated another 180° the second fluid channel member 96 would be positioned to direct the hydraulic fluid 26 to the first motor control port 28.

In the second position, hydraulic fluid 26 is introduced into the first internal piston chamber 38 to expand against the piston face 48, causing the piston rod 42 to travel in the direction indicated by arrow 98. Fluid 26 is now exhausted from the second piston chamber 40 through the second motor control port 30. First and second fluid channel members 100 and 102 serve to direct the fluid 26 from the second motor control port 30 through the third annular fluid passageway 64 formed about the third reduced diameter section 58 of slider member 16. The fluid 26 continues through the third annular fluid passageway 64 and is exhausted through the second reservoir exhaust port 24. Of course, as slider member 16 is rotated through another 180° to the position 4-2, the second fluid channel member 102 would be positioned to direct the hydraulic fluid 26 from the second motor control port 30 to the second reservoir exhaust port 24.

FIG. 3 is a perspective view of the slider member 16, corresponding to the position of slider member 16 illustrated in FIG. 2. The first, second and third reduced diameter sections 54, 56 and 58 are shown formed between the first and second fluid sealing ends 50 and 52, separated by the first and second enlarged diameter sections 66 and 68. The first fluid passage holes 82 comprising the first fluid flow port 80 of reduced diameter section 54 in shown to be spaced 90° about the circumference of the first reduced diameter section 54. Similarly, the first fluid passage holes 90, comprising the first fluid flow port 88 are shown spaced about the circumference of the second reduced diameter section 56 in alignment with the fluid passage holes 82.

The second fluid flow port 84 formed through the first fluid sealing land 70 in the position 1-3 is shown to be in alignment with the second fluid flow port 92 formed through the second fluid sealing land 72. Similarly, the first and second fluid channel members 94 and 96 formed about the first fluid sealing land 70 are 90° out of phase with the second fluid flow port 84 and in alignment with the first and second fluid members 100 and 102 formed about the second fluid sealing land 72.

FIG. 4 is a cross-sectional view of the slider 16 taken along the line 4—4 shown in FIG. 3. FIG. 5 is a similar cross-sectional view of the slider member 16 taken along the line 5—5. The first and second fluid sealing ends 50 and 52 are shown to include threaded portions 104 and 106 for engaging the respective coupling members 18 (illustrated in FIG. 1). The threaded member (not shown) received within the threaded portions 104 and 106 defines the end boundaries of the first and second fluid chambers 74 and 76.

FIG. 6 is a cross-sectional view of the second fluid flow port 92 and first and second fluid channels 100 and 102 formed about second fluid sealing members 72. The second fluid flow port 92 is shown to extend completely through the sealing member 72 for communicating with the internal fluid chamber 76. The first and second fluid channels 100 and 102 are 90° out of phase with the openings of the second fluid flow port 92 to direct the hydraulic fluid 26 from the second motor control port 30 to the third annular passageway, as illustrated in FIG. 2 and described hereinabove.

In operation, the servo valve illustated in the figures controls the rate and direction of flow of hydraulic fluid 26 from a fluid power source to the hydraulically driven motor 32. The lateral position of the slider valve 16 within the sleeve member 12 controls the rate of flow of hydraulic fluid 26. The slider member 16 is illustrated in FIGS. 1 and 2 in the half flow position, where the first and second fluid sealing members 70 and 72 block one half the entrance to the first and second motor control ports 28 and 30. The flow of hydraulic fluid to the first and second motor control ports 28 and 30 is reduced by lateral movement of the slider member 16 in the direction illustrated by arrow 87, enabling a no flow condition to be achieved when the first and second fluid sealing lands 70 and 72 completely block the motor control ports 28 and 30. Movement of the slider member 16 in the opposite direction illustrated by arrow 86 increases the rate of flow of hydraulic fluid through first and second motor control ports 28 and 30, allowing a full flow condition to be reached when the first and second fluid sealing lands 70 and 72 are completely removed from the motor control ports 28 and 30.

A set frequency for the reciprocating piston rod 42 may be established by controlling the revolutions of the slider member 16 within the sleeve member 12. The preferred embodiment of the slider member 16 illustrated and described hereinabove changes the direction of fluid flow and the direction the reciprocating piston four times per revolution. The direction of fluid flow illustrated in FIG. 1 occurs twice each cycle, driving the reciprocating piston rod 42 in the direction illustrated by arrow 46. In this first position "1-3" of the slider member 16, fluid enters the system through the pump entry port 20 and passes through the first fluid flow port 88 into the second fluid chamber 76, exiting through the second fluid flow port 92, which is aligned with the second motor control port 30. Fluid 26 continues through a hydraulic line (not illustrated) through the second piston chamber port 36 filling the second internal piston chamber 40. The hydraulic fluid 26 within chamber 40 expands against the piston face 44, driving the reciprocating piston rod 42 in the direction illustrated by arrow 46.

The movement of reciprocating piston 42 in the direction illustrated by arrow 46 causes the hydraulic fluid 26 within the first piston chamber 38 to be exhausted through the first piston chamber 34 through a hydraulic line (not illustrated) to the first motor control port 28. The exhaust path of the hydraulic fluid 26 is through the second fluid flow port 84 into the first fluid chamber 74. The fluid 26 exits from the fluid chamber 74 through the first flow port 80 where it is exhausted to the reservoir of the fluid power system through the first reservoir exhaust port 22. The hydraulic fluid 26 is directed through the same circuit when the slider member 16 is rotated 180° to the position "3-1".

The direction of flow of the hydraulic fluid 26 is altered by rotating the slider member 90° to the "2-4" position illustrated in FIG. 2. In this second position, the fluid 26 enters the servo valve 10 from the fluid power system through the same pump entry port 20. However, the fluid 26 cannot pass through the fluid chamber 76, since the second fluid flow port 92 is blocked by the internal walls of the cylindrical opening 14 of sleeve member 12. The fluid 26 flows through the second annular fluid passageway defined by the reduced diameter section 56 and the internal walls of the cylindrical opening 14 of sleeve member 12. Fluid 26 exits the second passageway 62 through the first fluid channel 94, directing the fluid to the first motor control port 28. Fluid 26 flows through the first piston chamber port into the first piston chamber 38, forcing the fluid 26 to work against the piston face 48. The reciprocating piston 42 is now reversed in direction by the action of the fluid 26 in the direction indicated by arrow 98. Now, the fluid within the second piston chamber 40 is compressed and exhausted through the second piston chamber port 36 connected to the second motor control port 30. Fluid 26 now flowing through motor control port 30 is directed through the first fluid channel 100 to the third annular fluid passageway 64. Finally, the fluid 26 is exhausted from this third fluid passageway 64 to the reservoir of the fluid power system through the second reservoir exhaust port 24. The fluid 26 is directed through the circuit illustrated in FIG. 2 and described above twice each cycle.

Although preferred embodiments of the invention have been illustrated in the accompanying drawings and described in the foregoing detailed description, it will be understood that the invention is not limited to the embodiments disclosed, but is capable of numerous rearrangements and modifications without departing from the spirit of the invention.

What is claimed is:

1. A servo valve having a slider member disposed for rotational and lateral movement within a sleeve member for alternating the direction of flow of a hydraulic fluid from a fluid power source through entry and exit ports within the sleeve member to motor control ports within the sleeve member to establish a set frequency of fluid flow for controlling a reciprocating piston of a hydraulically driven motor, wherein the improvement comprises:
   a plurality of chambers formed within said slider member, said chambers having first and second flow ports to provide fluid passageways through said chambers, such that a first fluid circuit is established from the fluid power source through said fluid passageways to one face of the reciprocating piston;
   reduced diameter sections formed on said slider member;
   increased diameter fluid sealing sections formed on said slider and disposed between said reduced diameter sections, such that annular fluid passageways are formed between the slider member and the sleeve member;
   fluid channels spaced about said fluid sealing sections such that a second fluid circuit through the annular fluid passageways and said fluid channels is established by rotating said slider member within said sleeve member causing fluid to be directed to the opposite face of the reciprocating piston; and
   means for rotating said slider member within said sleeve member to establish a cycle of fluid flow alternating between said first and second fluid circuits to establish a set frequency of reciprocating motion to the piston of the hydraulically driven motor.

2. The improved servo valve of claim 1 wherein said slider member may be moved laterally within said sleeve member to control the rate of fluid flow in said first and second fluid circuits.

3. The improved servo valve of claim 1 wherein said first fluid flow ports are formed about said recessed diameter sections of said slider and said second fluid flow ports are formed through said fluid sealing members.

4. The improved servo valve of claim 1 wherein first fluid flow ports being alignable with one of said exhaust ports and one of said entry ports to the fluid power system by rotation of the slider bringing said second fluid flow ports formed through the fluid sealing members into alignment with the motor control ports, such that said first fluid circuit is established.

5. The improved servo valve of claim 1, wherein said annular fluid passageways being aligned with the fluid power entry and exit ports by rotation of the slider bringing said fluid channels into alignment with the motor control ports, such that said second fluid circuit is established.

6. The improved servo valve of claim 1, and further comprising recessed force balancing sections formed within said sleeve member opposite each of said fluid power system entry and exit ports and said motor control ports, such that said slider is force balanced within said sleeve.

7. A servo valve for controlling the direction and rate of flow of a hydraulic fluid from a fluid power system to a hydraulically driven motor comprising:
   a sleeve member having a central cylindrical opening formed therethrough;
   an entry port disposed between two exhaust ports of said sleeve member for communicating a flow of hydraulic fluid between the servo valve and the fluid power system;
   first and second motor control ports formed in said sleeve member for communicating a flow of hydraulic fluid to a hydraulically driven motor;
   a slider member disposed for rotational and lateral movement within said central cylindrical opening of said sleeve member;
   fluid sealing end portions formed on said slider member for preventing fluid from escaping from said sleeve member;
   three reduced diameter sections formed on said slider member;
   two increased diameter fluid sealing sections formed on said slider and disposed between said reduced diameter sections, such that annular fluid passageways are formed between said slider member and said sleeve member;
   first and second fluid chambers formed within said slider member, each of said chambers including first and second flow ports for providing a fluid passageway through said chambers, such that a first fluid circuit is provided through said chambers by rotating said slider member within said sleeve member;
   fluid channels disposed about said increased diameter sections of said slider, such that said slider member is rotated to a second position such that a second fluid circuit is provided through said annular passageways for reversing the direction of fluid flow from the power system to the hydraulically driven motor; and
   means for rotating said slider member within said sleeve member for establishing a cycle of alternate flow of hydraulic fluid to the hydraulically driven motor through said first and second fluid circuits.

8. The servo valve of claim 7, said slider member being laterally positionable within said sleeve member such that said increased diameter fluid sealing members control the rate of fluid flow through said motor control ports.

9. The servo valve of claim 7, wherein said first flow ports of said slider chambers comprise a plurality of cylindrical openings spaced about said reduced diameter section for metering the flow of fluid entering and exhausting from said chambers.

10. The servo valve of claim 7, wherein said second flow ports of said slider comprise two apertures formed through said chamber of said slider member, said apertures being aligned with said first flow ports.

11. The servo valve of claim 7 and further recessed force balancing sections formed within said sleeve member opposite each of said fluid power system entry and exit ports and said motor control ports, such that said slider is force balanced within said sleeve.

12. A servo valve for controlling the direction and rate of flow of a hydraulic fluid from a fluid power system to the opposing face of a piston of a hydraulically driven motor, comprising:
- a sleeve member having a central cylindrical opening formed therethrough;
- a plurality of power system ports formed in said sleeve member for communicating a flow of hydraulic fluid between the servo valve and the fluid power system;
- a plurality of control ports formed in said sleeve member for communicating a flow of hydraulic fluid between the servo valve and the hydraulically driven motor;
- a slider member dimensioned to be received within the cylindrical opening of said sleeve member for rotational and lateral movement therein;
- a plurality of reduced diameter sections formed about said slider member and alternately spaced between fluid sealing sections, such that annular fluid passageways are formed between said slider member and said sleeve member;
- at least one fluid chamber formed within said slider member;
- a plurality of entry and exit ports formed through said fluid chamber, such that a first fluid passageway is provided through said chamber for directing a flow of fluid to one face of the piston of a hydraulically driven motor; and
- recessed fluid channels formed about said fluid sealing sections of said slider member, such that an alternate direction of hydraulic fluid is directed to the opposite piston face of the hydraulic motor by fluid flowing through a second fluid passageway formed through said annular fluid passageways and said fluid channels.

13. The servo valve of claim 12, wherein the rate of hydraulic fluid flowing from the fluid power system to either face of the piston of the hydraulically driven motor is controlled by lateral movement of said fluid sealing sections opposite said control ports.

* * * * *